(12) United States Patent
Pryor et al.

(10) Patent No.: US 11,346,102 B2
(45) Date of Patent: *May 31, 2022

(54) MOMENT FRAME LINKS WALL

(71) Applicant: Simpson Strong-Tie Company, Inc., Pleasanton, CA (US)

(72) Inventors: Steven E. Pryor, Dublin, CA (US); Guy T. Anderson, Valley Springs, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,562

(22) Filed: Mar. 29, 2021

(65) Prior Publication Data
US 2021/0222429 A1 Jul. 22, 2021

Related U.S. Application Data

(63) Continuation of application No. 15/419,741, filed on Jan. 30, 2017, now abandoned, which is a continuation of application No. 14/319,983, filed on Jun. 30, 2014, now abandoned, which is a continuation of application No. 13/214,000, filed on
(Continued)

(51) Int. Cl.
*E04B 1/98* (2006.01)
*E04H 9/02* (2006.01)
*E04B 1/24* (2006.01)
*E04H 9/14* (2006.01)
(Continued)

(52) U.S. Cl.
CPC .............. *E04B 1/98* (2013.01); *E04B 1/2403* (2013.01); *E04B 1/36* (2013.01); *E04B 2/56* (2013.01); *E04H 9/028* (2013.01); *E04H 9/0237* (2020.05); *E04H 9/14* (2013.01); *E04B 2001/2415* (2013.01); *E04B 2001/2442* (2013.01); *E04B 2001/2448* (2013.01);
(Continued)

(58) Field of Classification Search
CPC ............... E04H 9/024; E04B 1/2403; E04B 2001/2415; E04B 2001/2442; E04B 2001/2448; E04B 2001/2445; E04B 2001/2403; E04C 3/30
See application file for complete search history.

(56) References Cited

U.S. PATENT DOCUMENTS

| D2,267 S | 2/1866 | Page |
|---|---|---|
| D4,280 S | 8/1870 | Page |

(Continued)

FOREIGN PATENT DOCUMENTS

| JP | 2016572 A | 9/1979 |
|---|---|---|
| JP | 01284639 A | 11/1989 |

(Continued)

OTHER PUBLICATIONS

Office Action dated Feb. 9, 2016 in U.S. Appl. No. 29/494,510.
(Continued)

*Primary Examiner* — Brian D Mattei
*Assistant Examiner* — Charissa Ahmad
(74) *Attorney, Agent, or Firm* — Vierra Magen Marcus LLP

(57) ABSTRACT

A lateral bracing system having high initial stiffness and including yield links capable of effectively dissipating stresses generated within the lateral bracing system under lateral loads.

11 Claims, 13 Drawing Sheets

Related U.S. Application Data

Aug. 19, 2011, now Pat. No. 8,763,319, which is a continuation of application No. 10/847,851, filed on May 18, 2004, now Pat. No. 8,001,734.

(51) Int. Cl.
*E04B 1/36* (2006.01)
*E04B 2/56* (2006.01)

(52) U.S. Cl.
CPC .............. *E04B 2001/2463* (2013.01); *E04B 2001/2496* (2013.01); *Y02A 50/00* (2018.01)

(56) References Cited

U.S. PATENT DOCUMENTS

| | | |
|---|---|---|
| D7,751 S | 9/1874 | Conner |
| D26,310 S | 11/1896 | Cornell |
| D28,538 S | 5/1898 | Smila |
| D92,389 S | 6/1934 | Chernow |
| 1,970,965 A | 8/1934 | Leake |
| 2,008,087 A | 7/1935 | Stromberg |
| D97,261 S | 10/1935 | Chernow |
| 2,067,403 A | 1/1937 | Lea |
| D127,516 S | 5/1941 | Chernow |
| 2,447,660 A | 8/1948 | Miklowitz |
| D152,395 S | 1/1949 | Chernow |
| 2,629,906 A * | 2/1953 | Holmes ............... E04B 1/2604 403/73 |
| D173,148 S | 10/1954 | Emmite |
| 3,188,510 A | 6/1965 | Botden |
| 3,344,662 A | 10/1967 | Pruett |
| 3,350,917 A | 11/1967 | Wincklhofer et al. |
| 3,593,477 A | 7/1971 | Briggs |
| D222,526 S | 11/1971 | Meier |
| 3,685,866 A | 8/1972 | Patenaude |
| 3,716,957 A | 2/1973 | Bernardi |
| 3,716,959 A | 2/1973 | Bernardi |
| 3,762,114 A | 10/1973 | Ekijian |
| 3,960,458 A | 6/1976 | Sato et al. |
| 3,971,179 A | 7/1976 | Bodocsi |
| 4,031,746 A | 6/1977 | Furuta et al. |
| 4,047,341 A | 9/1977 | Bernardi |
| 4,065,218 A | 12/1977 | Biggane |
| 4,074,947 A | 2/1978 | Matake et al. |
| D249,587 S | 9/1978 | Asprinio |
| 4,112,746 A | 9/1978 | Itoh et al. |
| 4,320,602 A | 3/1982 | Richardson |
| 4,441,289 A | 4/1984 | Ikuo et al. |
| 4,531,334 A | 7/1985 | Nylander et al. |
| 4,541,287 A | 9/1985 | Roper |
| 4,577,826 A | 3/1986 | Bergstrom et al. |
| 4,719,347 A | 1/1988 | Kugler et al. |
| 4,766,706 A | 8/1988 | Caspe |
| 4,766,708 A | 8/1988 | Sing |
| 4,836,031 A | 6/1989 | Jatho et al. |
| 4,841,779 A | 6/1989 | Mitsuhashi et al. |
| 4,883,250 A | 11/1989 | Yano et al. |
| 4,905,436 A | 3/1990 | Matsuo |
| 4,910,929 A | 3/1990 | Scholl |
| 4,922,667 A | 5/1990 | Kobori et al. |
| 4,962,669 A | 10/1990 | Gernhart et al. |
| 5,054,324 A | 10/1991 | Pohl |
| 5,114,036 A | 5/1992 | Liu |
| 5,148,642 A | 9/1992 | Plumier |
| 5,163,256 A | 11/1992 | Fukumoto et al. |
| 5,218,802 A | 6/1993 | Yoshimure |
| D338,614 S | 8/1993 | Pierce |
| 5,237,876 A | 8/1993 | Liu |
| 5,349,794 A | 9/1994 | Taga |
| 5,375,382 A | 12/1994 | Weidlinger |
| 5,410,847 A | 5/1995 | Okawa |
| 5,533,307 A | 7/1996 | Tsai et al. |
| 5,595,040 A | 1/1997 | Chen |
| 5,630,298 A | 5/1997 | Tsai et al. |
| 5,660,017 A | 8/1997 | Houghton |
| 5,680,738 A | 10/1997 | Allen |
| 5,706,626 A | 1/1998 | Mueller |
| 5,727,663 A | 3/1998 | Taylor |
| 5,782,047 A | 7/1998 | De Quesada |
| 5,845,438 A | 12/1998 | Haskell |
| 5,862,639 A | 1/1999 | Abou-Rached |
| 5,913,794 A | 6/1999 | Chen |
| D420,273 S | 2/2000 | Rich et al. |
| 6,059,482 A | 5/2000 | Beauvoir |
| 6,073,405 A | 6/2000 | Kasai et al. |
| 6,094,259 A | 7/2000 | Kamegawa |
| 6,108,987 A | 8/2000 | De La Fuente |
| 6,138,427 A | 10/2000 | Houghton |
| 6,192,637 B1 | 2/2001 | Boilen et al. |
| 6,223,483 B1 | 5/2001 | Tsukagoshi |
| 6,226,935 B1 | 5/2001 | Kuramochi et al. |
| 6,233,884 B1 | 5/2001 | Tipping et al. |
| 6,247,275 B1 | 6/2001 | Taylor |
| 6,256,943 B1 | 7/2001 | Mander et al. |
| 6,308,469 B1 | 10/2001 | Leung |
| 6,345,534 B1 | 2/2002 | Takahashi |
| 6,374,551 B1 | 4/2002 | Boilen et al. |
| 6,424,149 B1 | 7/2002 | Takahashi |
| 6,438,905 B2 | 8/2002 | Constantinou |
| 6,474,902 B1 | 11/2002 | Beauvoir |
| D473,957 S | 4/2003 | Ito |
| 6,564,646 B1 | 5/2003 | Gerlach et al. |
| 6,668,508 B2 | 12/2003 | Boone et al. |
| 6,722,088 B2 | 4/2004 | Ouchi et al. |
| 6,761,001 B2 | 7/2004 | Mueller |
| 6,840,016 B1 | 1/2005 | Mualla |
| 6,871,456 B1 | 3/2005 | Mueller |
| 6,931,804 B2 | 8/2005 | Trarup et al. |
| D516,460 S | 3/2006 | Lamb |
| 7,076,926 B2 | 7/2006 | Kasai et al. |
| 7,080,487 B1 | 7/2006 | Mueller |
| 7,174,679 B1 | 2/2007 | Mueller |
| D550,005 S | 9/2007 | Yount |
| D561,563 S | 2/2008 | Hoffner |
| 7,377,181 B2 | 5/2008 | Christ, Jr. et al. |
| 7,461,481 B2 | 12/2008 | Tsai |
| 7,762,038 B2 | 7/2010 | Ceba |
| 8,074,359 B2 | 12/2011 | Bong |
| 8,863,584 B2 | 10/2014 | Kawano |
| 2002/0020122 A1 | 2/2002 | Mueller |
| 2002/0108325 A1 | 5/2002 | Hulls et al. |
| 2002/0184836 A1 | 12/2002 | Takeuchi et al. |
| 2003/0009964 A1 | 1/2003 | Trarup et al. |
| 2003/0009977 A1 | 1/2003 | Houghton |
| 2003/0041551 A1 | 3/2003 | Boone et al. |
| 2004/0112140 A1 | 6/2004 | Takahashi |
| 2004/0154258 A1 | 8/2004 | Hulls et al. |
| 2004/0244330 A1 | 12/2004 | Takeuchi et al. |
| 2005/0077664 A1 | 4/2005 | Mochimaru et al. |
| 2005/0204684 A1 | 9/2005 | Houghton |
| 2005/0257450 A1 | 11/2005 | Tsai |
| 2006/0080907 A1 | 4/2006 | Hulls et al. |
| 2006/0144006 A1 | 7/2006 | Suzuki et al. |
| 2006/0179729 A1 | 8/2006 | Li |
| 2006/0260222 A1 | 11/2006 | Lee |
| 2007/0125034 A1 | 6/2007 | Kawai et al. |
| 2008/0120927 A1 | 5/2008 | Tsai |
| 2008/0148681 A1 | 6/2008 | Hiriyur et al. |
| 2008/0250732 A1 | 10/2008 | Tsai |
| 2008/0289268 A1 | 11/2008 | Sarkisian |
| 2009/0223166 A1 | 9/2009 | Ohata et al. |
| 2009/0277125 A1 | 11/2009 | Smith et al. |
| 2011/0308190 A1 | 12/2011 | Pryor et al. |
| 2012/0287248 A1 | 11/2012 | Erdman, III et al. |
| 2013/0305833 A1 | 11/2013 | Kittur |
| 2015/0143861 A1 | 5/2015 | Sato et al. |
| 2015/0159369 A1 | 6/2015 | Pryor et al. |
| 2015/0267394 A1 | 9/2015 | Houghton et al. |
| 2015/0275501 A1 | 10/2015 | Houghton |

FOREIGN PATENT DOCUMENTS

| | | |
|---|---|---|
| JP | 01312171 A | 12/1989 |
| JP | 01318627 A | 12/1989 |

(56) References Cited

FOREIGN PATENT DOCUMENTS

| | | | |
|---|---|---|---|
| JP | 02027070 A | 1/1990 | |
| JP | 02285175 A | 11/1990 | |
| JP | 03021740 A | 1/1991 | |
| JP | 3137368 | 6/1991 | |
| JP | 03180675 A | 6/1991 | |
| JP | 03228975 A | 10/1991 | |
| JP | 06200657 A | 7/1994 | |
| JP | 06212835 A | 8/1994 | |
| JP | 06240922 A | 8/1994 | |
| JP | 06257321 A | 9/1994 | |
| JP | 06264646 A | 9/1994 | |
| JP | 06323038 A | 11/1994 | |
| JP | 2000144901 A | 5/2000 | |
| JP | 2002364081 A | 12/2002 | |
| JP | 2003184176 A | 7/2003 | |

OTHER PUBLICATIONS

Rai et al., "Aluminum Shear-Link For Seismic Energy Dissipation," 12WCEE 2000, Jan.-Feb. 2000.
Office Action dated Feb. 7, 2008 in U.S. Appl. No. 10/847,851.
Response to Office Action filed Mar. 6, 2008 in U.S. Appl. No. 10/847,851.
Office Action dated Apr. 14, 2008 in U.S. Appl. No. 10/847,851.
Response to Office Action filed Oct. 14, 2008 in U.S. Appl. No. 10/847,851.
Office Action dated Jan. 23, 2009 in U.S. Appl. No. 10/847,851.
Response to Office Action filed Apr. 23, 2009 in U.S. Appl. No. 10/847,851.
Final Office Action dated Aug. 14, 2009 in U.S. Appl. No. 10/847,851.
Response to Final Office Action filed Jul. 14, 2010 in U.S. Appl. No. 10/847,851.
Office Action dated Sep. 14, 2010 in U.S. Appl. No. 10/847,851.
Response to Office Action filed Jan. 14, 2011 in U.S. Appl. No. 10/847,851.
Final Office Action dated Feb. 15, 2011 in U.S. Appl. No. 10/847,851.
Response to Final Office Action filed May 16, 2011 in U.S. Appl. No. 10/847,851.
Notice of Allowance and Fee(s) Due dated Jun. 7, 2011 in U.S. Appl. No. 10/847,851.
Office Action dated Nov. 3, 2011 in U.S. Appl. No. 13/214,000.
Response to Office Action filed Mar. 5, 2012 in U.S. Appl. No. 13/214,000.
Requirement for Restriction/Election dated May 7, 2012 in U.S. Appl. No. 13/214,000.
Response to Restriction/Election filed Jul. 2, 2012 in U.S. Appl. No. 13/214,000.
Office Action dated Aug. 8, 2012 in U.S. Appl. No. 13/214,000.
Response to Office Action filed Jan. 8, 2013 in U.S. Appl. No. 13/214,000.
Final Office Action dated Oct. 23, 2013 in U.S. Appl. No. 13/214,000.
Response to Final Office Action filed Jan. 23, 2014 in U.S. Appl. No. 13/214,000.
Notice of Allowance and Fee(s) due dated Feb. 21, 2014 in U.S. Appl. No. 13/214,000.
Requirement for Restriction/Election filed Jan. 16, 2015, in U.S. Appl. No. 14/319,983.
Response to Election/Restriction filed Mar. 16, 2015 in U.S. Appl. No. 14/319,983.
Response to Election/Restriction filed Mar. 27, 2015 in U.S. Appl. No. 14/319,983.
Office Action dated Apr. 27, 2015, in U.S. Appl. No. 14/319,983.
Response to Office Action filed Jul. 27, 2015.
Final Office Action dated Nov. 5, 2015, in U.S. Appl. No. 14/319,983.
Response to Final Office Action filed Mar. 7, 2016, in U.S. Appl. No. 14/319,983.
Office Action dated Mar. 29, 2016, in U.S. Appl. No. 14/319,983.
Response to Office Action filed Jun. 29, 2016.
Response to Office Action filed Feb. 27, 2017.
Ex Parte Quayle Office Action dated Jul. 12, 2017 in U.S. Appl. No. 29/494,510.
Response to Office Action filed Mar. 12, 2018 in U.S. Appl. No. 29/494,510.
Office Action dated Oct. 12, 2018 in U.S. Appl. No. 29/494,510.
Hoosier Homemade, Spring Craft DIY Home Decor, Image: Earliest review date: Mar. 24, 2012. Site visited on Jul. 16, 2018, <https://hoosierhomemade.com/spring-craft-diy-home-decor/>.
Response to Office Action filed Apr. 12, 2019 in U.S. Appl. No. 29/494,510.
Final Office Action dated Mar. 2, 2020 in U.S. Appl. No. 29/494,510.
Requirement for Restriction/Election dated Sep. 19, 2018 in U.S. Appl. No. 15/419,741.
Response to Requirement for Restriction/Election filed Nov. 19, 2018 in U.S. Appl. No. 15/419,741.
Office Action dated Mar. 23, 2020 in U.S. Appl. No. 15/419,741.
Response to Office Action filed Aug. 21, 2020 in U.S. Appl. No. 15/419,741.
Final Office Action dated Dec. 9, 2020 in U.S. Appl. No. 15/419,741.

* cited by examiner

MOMENT FRAME LINKS WALL

CLAIM OF PRIORITY

This application is a continuation of U.S. patent application Ser. No. 15/419,741 filed Jan. 30, 2017 entitled MOMENT FRAME LINKS WALL, which is a continuation of U.S. patent application Ser. No. 14/319,983 filed Jun. 30, 2014 entitled MOMENT FRAME LINKS WALL, which is a continuation of U.S. patent application Ser. No. 13/214,000 filed Aug. 19, 2011 entitled MOMENT FRAME LINKS WALL, now U.S. Pat. No. 8,763,319, which is a continuation of U.S. patent application Ser. No. 10/847,851 filed on May 18, 2004 entitled MOMENT FRAME LINKS WALL, now U.S. Pat. No. 8,001,734, which applications are incorporated herein by reference in their entirety.

BACKGROUND OF THE INVENTION

Field of the Invention

The present invention relates to hysteretic damping for structures used in light-framed constructions, and in particular to a lateral bracing system constructed to provide a high degree of energy dissipation through hysteretic damping along with high initial stiffness so that energy is dissipated at low force thresholds within a light-framed construction.

Description of the Related Art

Shear stresses due to natural phenomena such as seismic activity and high winds can have devastating effects on the structural integrity of light-framed constructions. Lateral forces generated during such natural phenomena may cause the top portion of a wall to move laterally with respect to the bottom portion of the wall, which movement can result in damage or structural failure of the wall and, in some instances, collapse of the building.

In constructions such as residences and small buildings, lateral bracing systems were developed to counteract the potentially devastating effects of shear stress on the structural integrity of light-framed constructions. Although various designs are known, typical lateral bracing systems include vertical studs spaced from each other and affixed to horizontal top and bottom plates. The bottom plate is typically anchored to the floor diaphragm or foundation. The bracing system typically further includes sheathing affixed to the studs, upper plate and/or lower plate to increase structural performance under lateral forces. The sheathing used may be oriented strand board (OSB) or plywood, but fiberboard, particleboard and drywall (gypsum board) are also used.

Alternatively or additionally, light-framed construction wall sections may include lateral bracing systems in the form of prefabricated shearwalls. Shearwalls within wall sections of light-framed constructions provide lateral stability and allow the lateral forces in the wall sections to be transmitted from the upper portions of the wall through the shearwalls to the floor diaphragm or foundation of the building where they are dissipated without structural effect on the wall or building.

Many conventional lateral bracing systems perform well initially under lateral loads, but yield and fail upon the repetitive lateral loads which often occur during significant seismic activity and high winds. Upon appreciable yield or failure of the lateral bracing system, the entire system must be replaced.

It is known to provide conventional high strength walls that are capable of withstanding significant lateral loads that occur during seismic and other events. However, such walls place high demands on foundation anchorage and the foundation itself. Namely, the holdown bolts and foundation must also be made strong enough to withstand the large forces transmitted from the wall as they are dissipated through the holdown bolts and into the foundation. Therefore, while stronger walls conventionally perform better under the seismic activity and other loads, conventional design requirements attendant stronger walls cascade throughout the entire structure, requiring stronger foundation anchorage and stronger foundations.

A further difficulty with conventional lateral bracing walls is that the corners of such walls tend to bind against their support surfaces under lateral loads. FIG. 1 shows a conventional shearwall 20 mounted at its bottom on a support surface 22 and at its top to a pair of top plates 24. A lateral force F as shown will result in a downward force F1 at point A and an upward force F2 at point B. Under high lateral loads, these upward and downward loads can damage the wall 20 and/or the support structures above and below the wall.

SUMMARY OF THE INVENTION

It is, therefore, an advantage of the present invention to provide a lateral bracing structure having high initial stiffness.

It is another advantage of the present invention to provide a lateral bracing system including controlled and predictable deflection and load bearing characteristics of the wall member and controlled and predictable yield of the yield links.

It is a still further advantage of the present invention to provide a lateral bracing system where failure is limited to the yield links, which are easily replaced, thereby restoring the lateral bracing system to its full load bearing capacity.

It is another advantage of the present invention to provide a lateral bracing system capable of fitting between conventionally located wall studs, and which can be isolated from gravity loads.

These and other advantages are provided by the present invention, which in embodiments relates to a lateral bracing system for use in constructions such as light framed constructions. The lateral bracing includes a structural moment frame supported between an underlying support surface such as a building foundation and an upper support surface such as a top plate. The moment frame may be pivotally affixed to the underlying support surface by a pivot coupling, such as for example a pin joint. The moment frame may similarly be affixed to the upper support surface by a second pivot coupling.

The lateral bracing system may further include a pair of yield links affixed between the frame and the underlying surface, one such yield link on each side of the moment frame. The yield link is provided to yield under a lateral load applied to the structural frame. Upon such yielding, the pivot couplings allow the structural frame to pivot to dissipate stress from within the structural frame. The yield links have a yield point below that of the moment frame, and will yield under lateral forces exerted on the lateral bracing system before the moment frame. Thus, damage to the moment frame is prevented by allowing the moment frame to pivot and dissipate the energy within the moment frame which could otherwise damage the moment frame if it were allowed to build up beyond the yield point of the moment frame.

In an alternative embodiment of the present invention, a second pair of yield links may be provided between the moment frame and the upper support surface to improve the rigidity of the structure while still allowing the links to yield prior to damage to the structural moment frame. In embodiments including one or two pairs of yield links, in the event the links are damaged upon yielding, the lateral bracing system may be restored to its virgin integrity and load bearing capabilities simply by removing and replacing the yield links. The structural frame need not be replaced.

In another alternative embodiment of the present invention, the lateral bracing system may consist of a vertical column element coupled to a horizontal beam element with a moment resisting joint. This moment resisting joint could consist of a central hinge, for example defined by a mounting element, with a pair of exterior yielding links, one on either side of the central hinge. The bending strength of the column and beam could be designed to exceed the moment capacity of the yielding links, thus restricting damage in a lateral event to the links only. Furthermore, the beam could be configured to either run over the top of the column, or frame into the side of the column, without impacting the performance of the connection via the yielding links.

Additionally, the moment resisting joint between the beam and column alleviates the need for a similar connection at the column base, at, for example, the foundation or lower floor. This means that forces that would otherwise be transmitted to the foundation or floor are drastically reduced, and energy dissipation of a lateral event would be contained within the frame and not rely on a yielding connection to the surrounding structure. Such a beam/column configuration may be used in a variety of applications, such as for example at the structural opening at garage fronts in light frame constructions, or around windows in light frame constructions. In such an installation a column element could also be placed on either side of the beam element allowing for two energy dissipating joints in the assembly, each containing a pair of yielding links.

BRIEF DESCRIPTION OF THE DRAWINGS

The present invention will now be described with reference to the figures, in which.

DETAILED DESCRIPTION

The present invention will now be described with reference to FIGS. 2 through 15, which in embodiments of the invention relate to a lateral bracing system having high initial stiffness and including yield links capable of effectively dissipating shear stresses generated within the lateral bracing system under lateral loads. It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
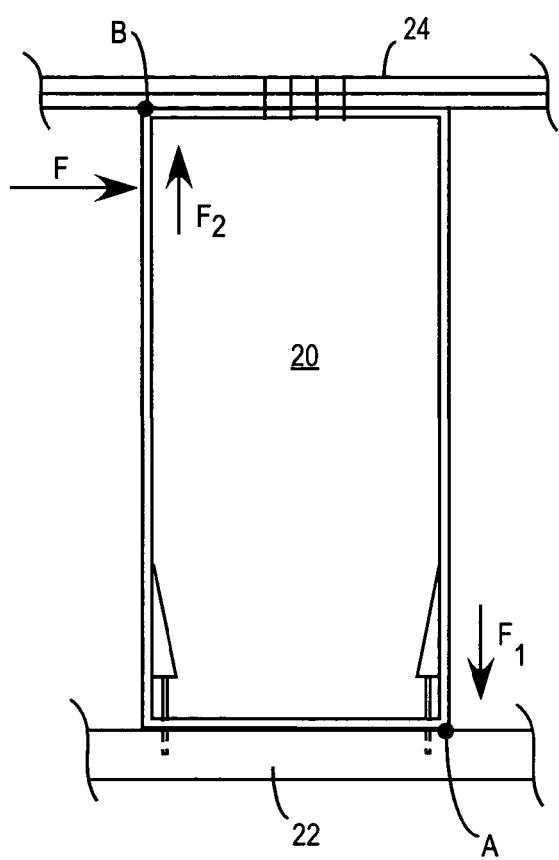
FIG. 1 is a prior art front view of a conventional wall under a lateral load.
Figure 2:
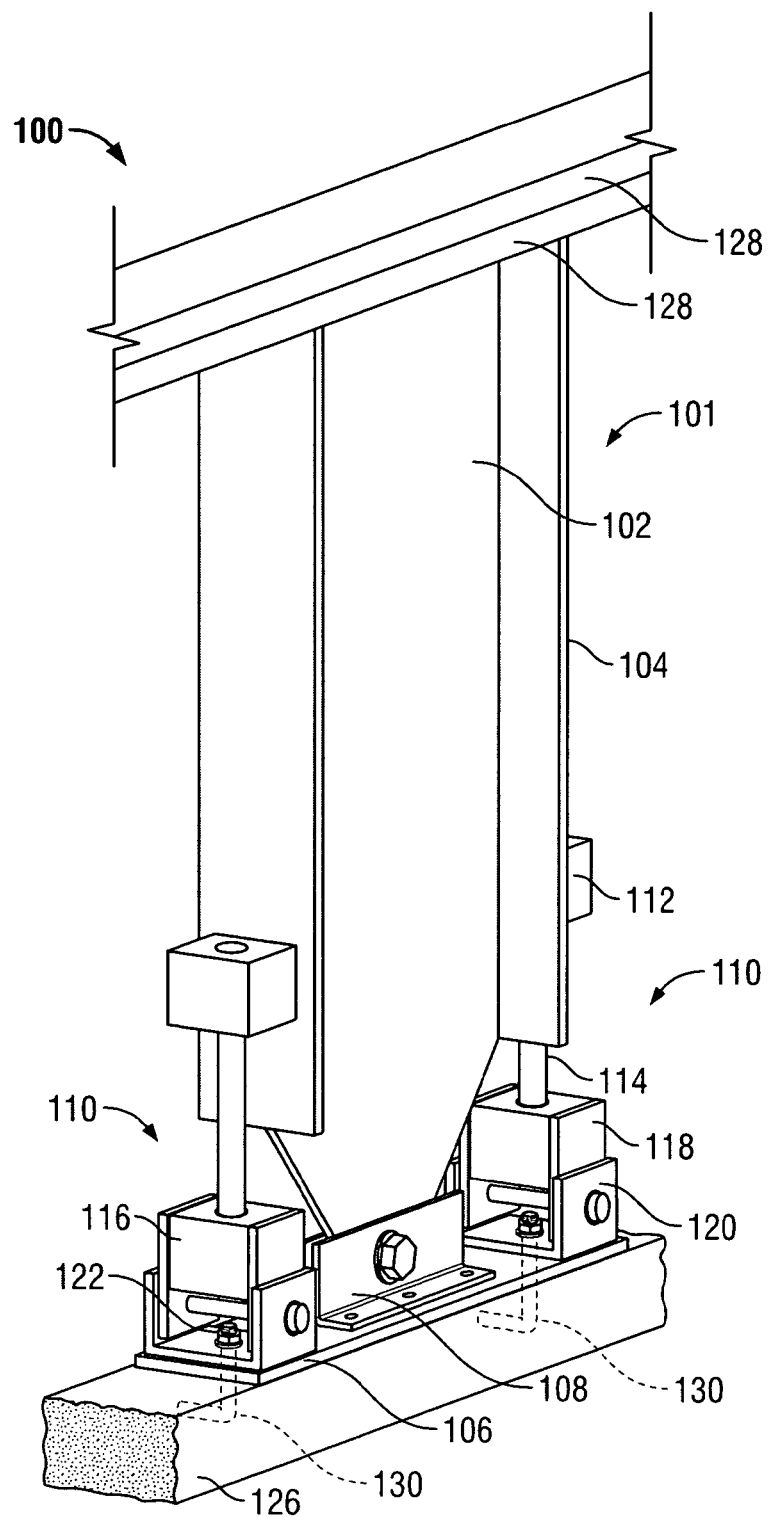
FIG. 2 is a perspective view of a lateral bracing system according to a first embodiment of the present invention.
Figure 3:
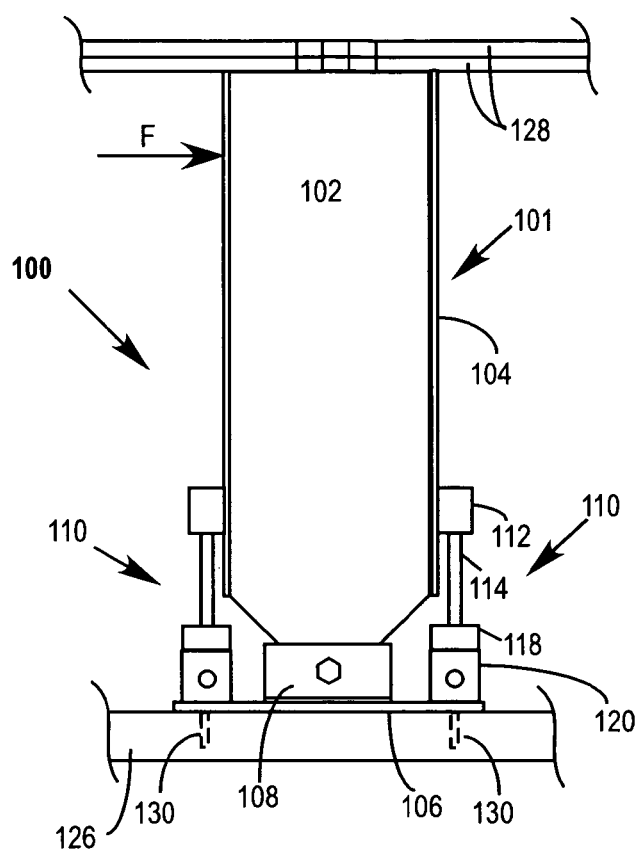
FIG. 3 is a front view of the lateral bracing system shown in FIG. 1.
Figure 4:
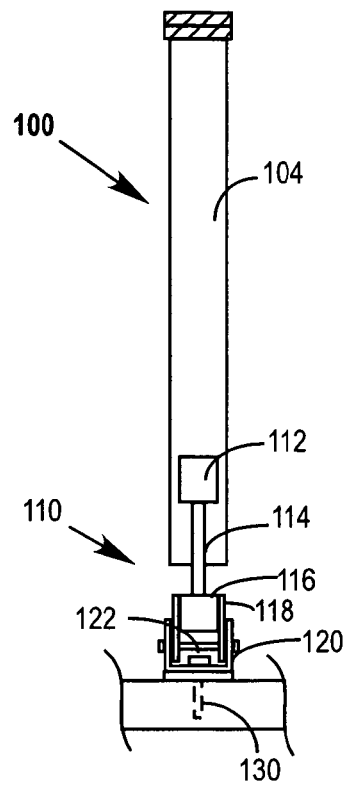
FIG. 4 is a side view of the lateral bracing system shown in FIG. 2.

Referring now to FIGS. 2-4, there is shown a lateral bracing system 100 including a moment frame 101 and yield links 110. Moment frame 101 is a structural frame including a substantially flat planar diaphragm 102 bounded along each of its longitudinal edges by framing members 104. Diaphragm 102 and framing members 104 may each be formed of 7-gauge sheet steel (0.1875 inches). Other gauges, such as for example 10-gauge sheet steel, and other materials, such as for example sawn and/or engineered lumber may be used in alternative embodiments. Additionally, instead of the diaphragm and framing members being separate pieces, the moment frame 101 may instead by formed of a single rolled steel section having a C-shape or Z-shape in a horizontal cross-section. While framing members are shown only along the two vertical edges of diaphragm 102, it is understood that the framing members may additionally extend around the top and/or bottom edges of the diaphragm 102 in alternative embodiments.

Diaphragm 102 is mounted to a sill plate 106 by a pair of right angle brackets 108, formed for example of ½ inch thick steel plate. Each of the right angle brackets 108 includes a first section mounted on sill plate 106 as by welding, bolting, gluing and/or other affixation mechanisms, and each bracket 108 includes a second portion extending up from the sill plate which is juxtaposed to each other in a spaced and parallel relation. The second portions of each of brackets 108 are spaced so as to receive a lower portion of diaphragm 102 therebetween. The diaphragm 102 may be fixed to the brackets 108 by a pivot coupling such as a pin joint formed by pin 109 (FIG. 5) fixed within a hole formed in each of the second portions of bracket 108 and the lower portion of diaphragm 102. The pin joint allows pivoting of the moment frame under an applied lateral load. As explained hereinafter, the top of the moment frame may also be mounted to its support surface by a pivot coupling allowing pivoting of the moment frame under lateral loads. As is also explained hereinafter, the top and/or bottom of the moment frame may be affixed with a fixed coupling instead of a pivot coupling.

The pin joint fixedly mounts the diaphragm 102 to the brackets 108 and sill plate 106, but prevents stress between the diaphragm and the brackets by allowing the diaphragm to pivot with respect to the brackets. Thus, together with the yield links (explained hereinafter), the pin joint prevents damage to the moment frame 101, by allowing the moment frame to pivot, thereby preventing the build-up of large sheer stresses within the moment frame 101 that would otherwise occur if the moment frame were constrained from pivoting.

The bottom portion of diaphragm 102 has edges which slope upward from a neutral longitudinal axis of diaphragm 102 to framing members 104 as shown in FIGS. 2, 3, 5 and 5A. The slope prevents contact or binding of portions of lateral bracing system 100 against the sill plate upon pivoting of the lateral bracing system under lateral loads. Such contact could otherwise damage the moment frame, sill plate and/or the underlying surface. The angle of the slope may vary in alternative embodiments, from greater than zero degrees and higher from the horizontal, and from about 2° to about 5° in further embodiments. It is also contemplated that the bottom portion of the diaphragm 102 have no slope, but rather be horizontal to sill plate 106. Such an embodiment is shown for example in FIG. 5B. In such an embodiment, the bottom edge of the diaphragm may be flush against or slightly spaced from the sill plate.

Sill plate 106 is in turn affixed to an underlying surface by anchors 130 as explained hereinafter. In embodiments of the invention, sill plate 106 may be formed of ½-inch thick steel. It is understood that both sill plate 106 and right angle brackets 108 may be formed of thicknesses other than ½-inch, and/or materials other than steel, in alternative embodiments of the invention.

Yield links 110 are provided to dissipate shear stresses within lateral bracing system 100 generated by lateral loads, and to prevent the moment frame 101 from being damaged due to such sheer stresses. The lateral bracing system 100 exhibits high stiffness and rigidity for sheer stresses within the system below a threshold level. However, yield links 110 have a yield capacity below bending strength of moment frame 101, and will yield under lateral forces exerted on the lateral bracing system before moment frame 101.

A lateral force on bracing system 100 will result in upward and downward forces in the framing members 104 and along the longitudinal edges of the moment frame 101, as well as shear stresses within the moment frame around the neutral longitudinal axis of the moment frame. The upward and downward forces are transmitted to and borne by the yield links 110. However, at lateral forces above a predetermined threshold, the yield links will yield, allowing the moment frame to pivot around the pin joint(s) and dissipating the shear stresses from within the moment frame. The pivoting allowed by the pin joint(s) and the yielding of the yield links thus prevents damage to the moment frame which may have occurred if the shear stresses within the moment frame were allowed to exceed the yield point of the moment frame. As explained hereinafter, the yield links 110 have a design allowing them to yield stably under both tension yield and compression yield.

Embodiments of the present invention preferably include a pair of yield links 110, one on either side of moment frame 101. For ease of description, only one of the yield links 110 will be described hereinafter. However, it is understood that the yield links are identical to each other in embodiments of the present invention, and the following description applies to both yield links. It is understood that the yield links may not be identical to each other in alternative embodiments of the present invention. Moreover, it is contemplated that lateral bracing system 100 includes only one yield link 110 on either side of moment frame 101 in alternative embodiments of the invention.

A yield link 110 is preferably formed of a yield member 114 mounted to the lateral bracing system by an upper mount 112 and a lower mount 116. The yield member 114 may have ends which are threaded, so as to mate with threads within the upper and lower mounts 112, 116 to affix the yield member to the mounts. In such an embodiment, the threads at opposite ends of yield member 114 may be oppositely facing so that the distance between mounts 112 and 116, and the forces within yield link 110, may be adjusted by rotating yield member 114. It is understood alternatively that yield member 114 may be affixed to upper and lower mounts 112, 116 as by welding, bolting, gluing and/or other affixation mechanisms.

Upper and lower mounts 112, 116 are preferably formed of steel. Yield member 114 may be formed of mild steel, such as for example ASTM A36 steel. Other materials exhibiting stable yielding qualities and good energy absorption may alternatively be used for yield member 114, including other metals such as for example copper and bronze, and various polymers.

In embodiments of the present invention, a casing (not shown) may be provided around yield member 114 so that yield member 114 and the casing together form an element with not only stable tension yielding behavior, but also stable compression yielding behavior because of the prevention of buckling by the casing. The casing in such an embodiment may be formed of various materials, such as concrete, a variety of polymers, or wood.

Whether formed of yield member 114 by itself, or as part of a buckling restrained element, the yield member 114 will yield stably, controllably and predictably in tensile yields and/or compression yields upon application of lateral loads above a threshold level. The threshold level at which the yield member will yield may also be controlled and predictable based on the configuration of the yield link. The thickness of the steel from which the yield member 114 is formed, as well as the length of the yield member, may be optimized by computer modeling to provide the desired performance and yield characteristics for yield links 110.

If the moment capacity of the joints is known by virtue of the link yield capacity and the physical geometry of the section, then the moment frame can be sized to exhibit elastic behavior even while the full inelastic strength of the links are being taxed. In one embodiment, yield member 114 may be formed of 1 inch diameter steel, and the upper and lower mounts may be separated a distance of 6 inches. However, it is understood that the desired configuration of the yield links may vary in alternative embodiment.

Moreover, although yield link 110 is shown including a straight length of circular steel in the figures, it is understood that yield link 110 may have various configurations in different embodiments of the present invention, with a provision that the yield link stably under lateral loads applied to lateral bracing system 100. For example, in one embodiment, the straight yield member 114 may be replaced by a length of steel having a variety of configurations that will allow yield link 110 to stably yield under lateral loads above predictable levels. The yield member 114 may include bends or a helix. It may also have cross-sectional shapes other than round in alternative embodiments, such as for example that shown in FIG. 5A, discussed hereinafter.

Upper mount 112 may be affixed to frame member 104 as by welding, bolting, gluing and/or other affixation mechanisms. Lower mount 116 may be affixed to sill plate 106 by mounting plates 118, which may be steel plates affixed to opposed sides of lower mount 116. Mounting plates 118 may in turn be bolted to a U-shaped channel 120 by a pin joint including pin 122 fixed within holes formed in opposed mounting plates 118 and opposed sidewalls of U-shaped channel 120. The pin joint allows pivoting of yield link 110 with respect to the U-shaped channel 120 and sill plate 106 to prevent generation of sheer stresses between yield link 110 and U-shaped channel 120.

It is understood that lower mount 116 may be affixed to sill plate 106, either directly or indirectly, by other mechanisms in alternative embodiments of the present invention. For example, in one such alternative embodiment, the mounting plates 118 may be omitted, and a hole formed through the lower mount so as to allow the lower mount to be affixed to the U-shaped channel 120 by pin 122. Moreover, it is understood that the pin joint may be omitted in an alternative embodiment, so that the lower mount 116 is affixed to the sill plate 106 without the ability to freely pivot with respect to the sill plate. It is further understood that the upper mount 112 may be affixed to the frame member 104 by a pin joint between the upper mount and the frame member instead of or in addition to the pin joint mounting the lower mount 116 to the sill plate 106.

Figure 5:
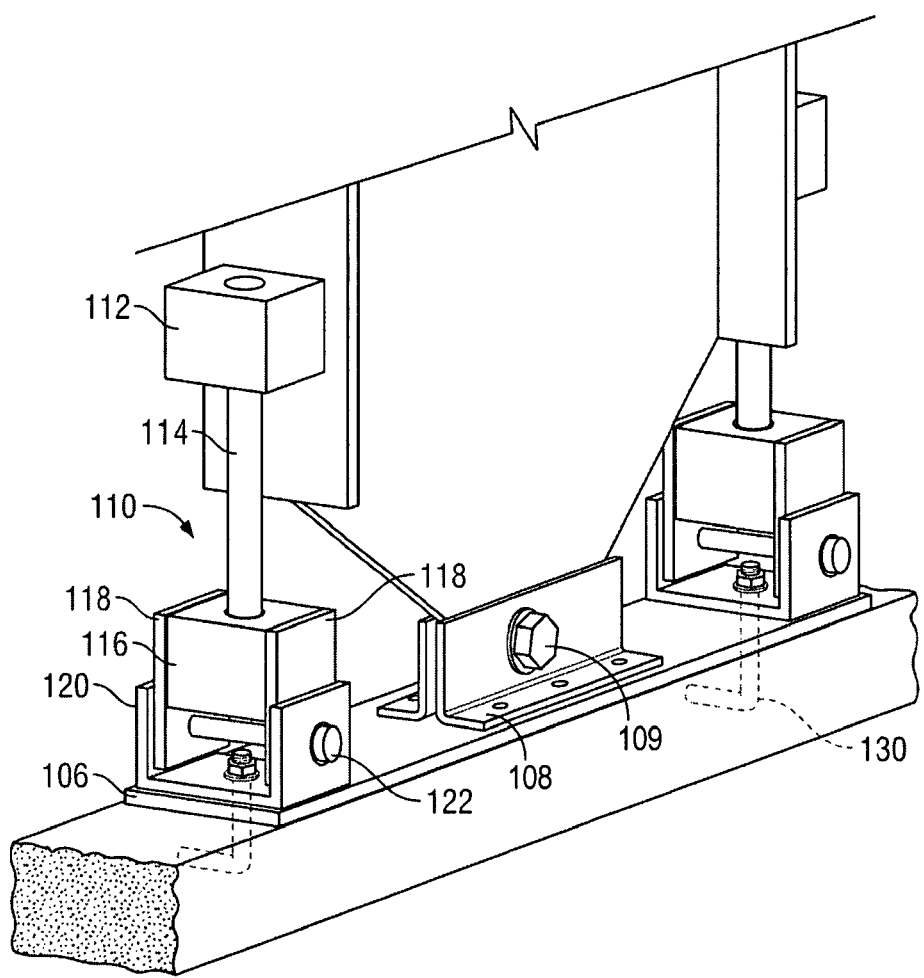
FIG. 5 is an enlarged partial perspective view of a bottom portion of the lateral bracing system according to the present invention.
Figure 5A:
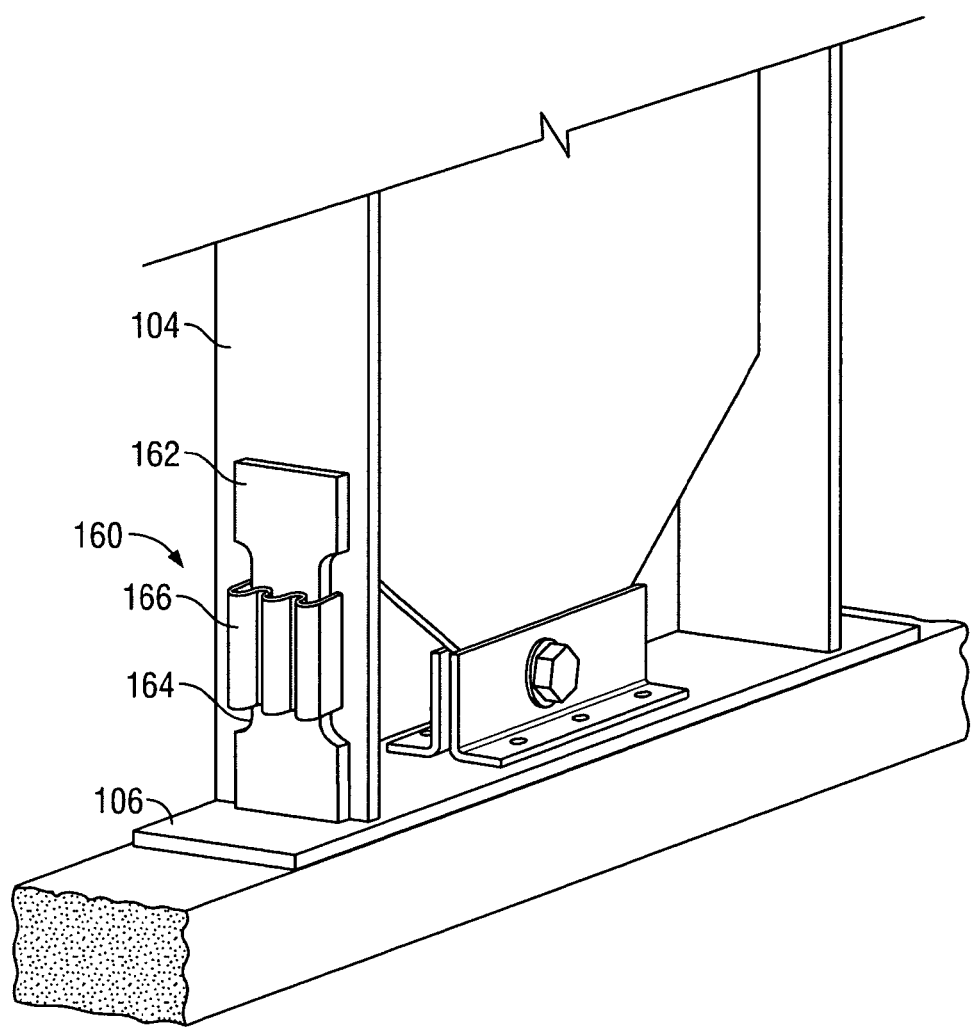
FIG. 5A is an enlarged partial perspective view of a bottom portion of the lateral bracing system including yield links according to an alternative embodiment of the present invention.
Figure 5B:
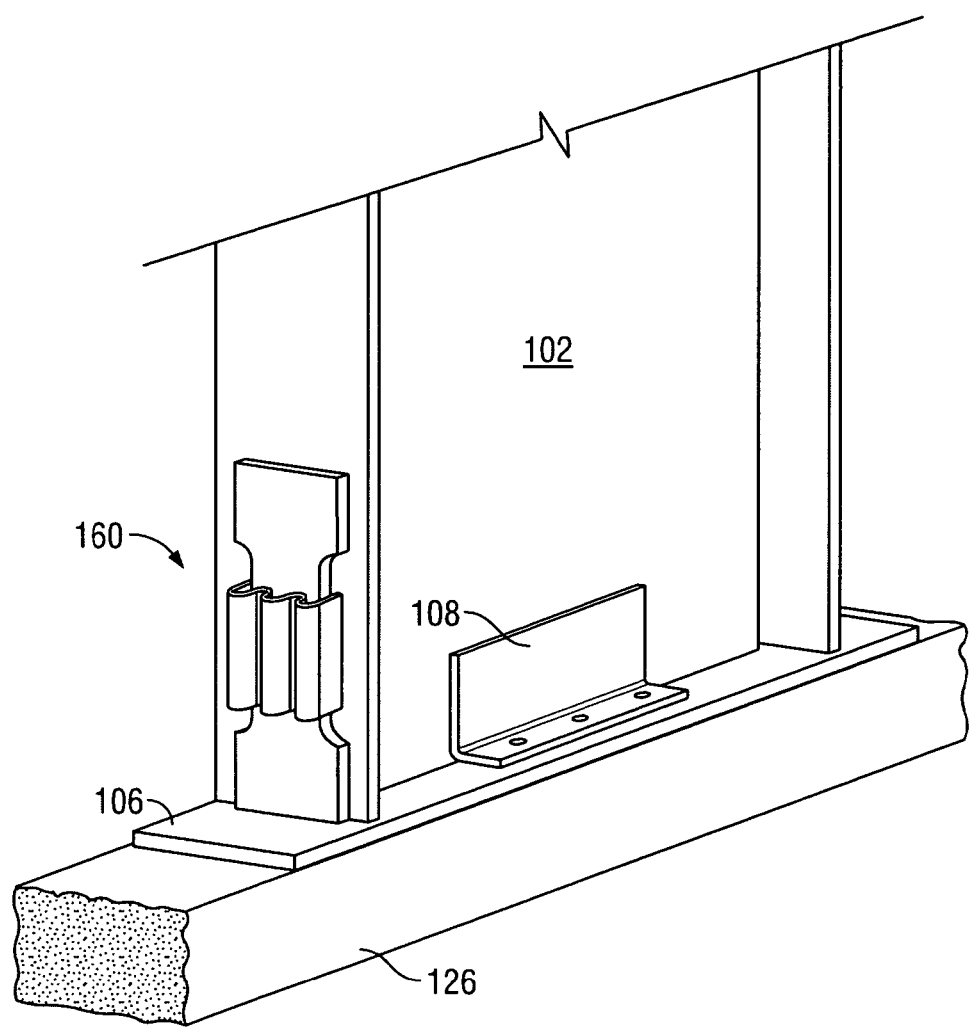
FIG. 5B is an enlarged partial perspective view of a bottom portion of the lateral bracing system according to an alternative embodiment of the present invention.

An alternative embodiment of a yield link in accordance with the present invention is shown in FIG. 5A. The yield link 160 according to this embodiment may be formed from one or more flat plate elements 162 that are affixed at one end to the frame member 104 by bolts, welding, gluing and/or other affixation means, and at the opposite end to the sill plate 106 by bolts, welding, gluing and/or other affixation means. The flat plate element(s) may have a constant cross-sectional shape, or the element(s) may have a central tapered midsection 164 similar to a milled steel coupon sample. A buckling restraint stiffener 166 as shown may further be provided. The buckling restraint stiffener 166 may be affixed to the frame member 104 as by bolting, welding, gluing and/or other affixation means. The buckling restraint stiffener shown has a corrugated cross-section, but it is understood that other cross-sections may be provided to effectively restrain the flat plate element 162 from buckling under compressive loads.

Sill plate 106 is mounted on an underlying support surface 126 by means of anchors 130. In the embodiment shown, the underlying support surface 126 comprises a concrete foundation, but it is understood that underlying support surface 126 may be any surface on which a conventional lateral bracing system may be located, for example, a floor diaphragm on the building foundation or a floor diaphragm on a top plate of a lower floor. Anchors 130 may be conventional anchors for mounting a wall section to underlying support surface 126, and depending on the nature of support surface 126, anchors 130 may be for example strap anchors, mud sill anchors, retrofit bolts, foundation plate hold downs, straps, ties, nails, screws, framing anchors, plates or a combination thereof.

The bracing system 100 may be attached to one or more top plates 128, as by bolts fitting through the top plates and into moment frame 101. It is understood that the bracing system 100 may be affixed to top plates 128 by other mechanisms in alternative embodiments.

Figure 6:
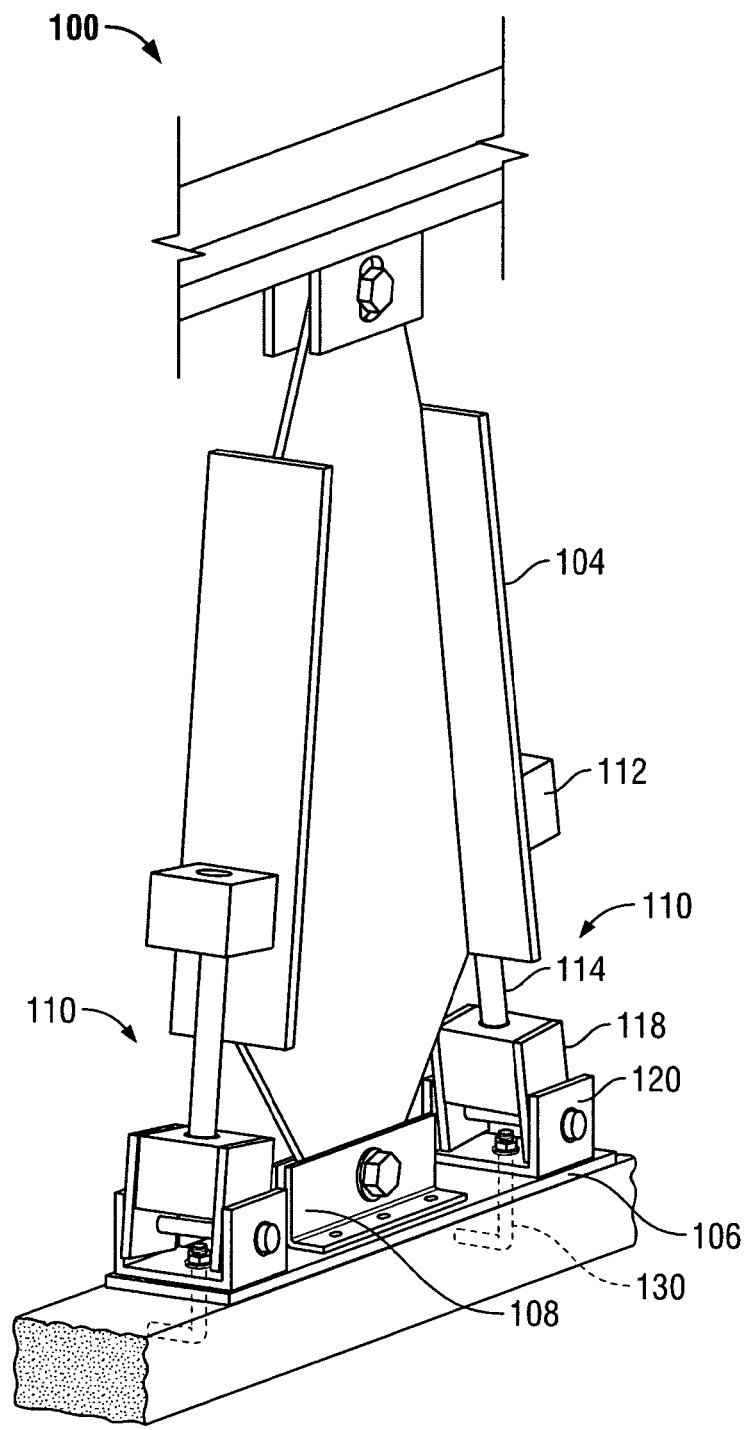
FIG. 6 is a perspective view of a lateral bracing system according to a second embodiment of the present invention.
Figure 7:
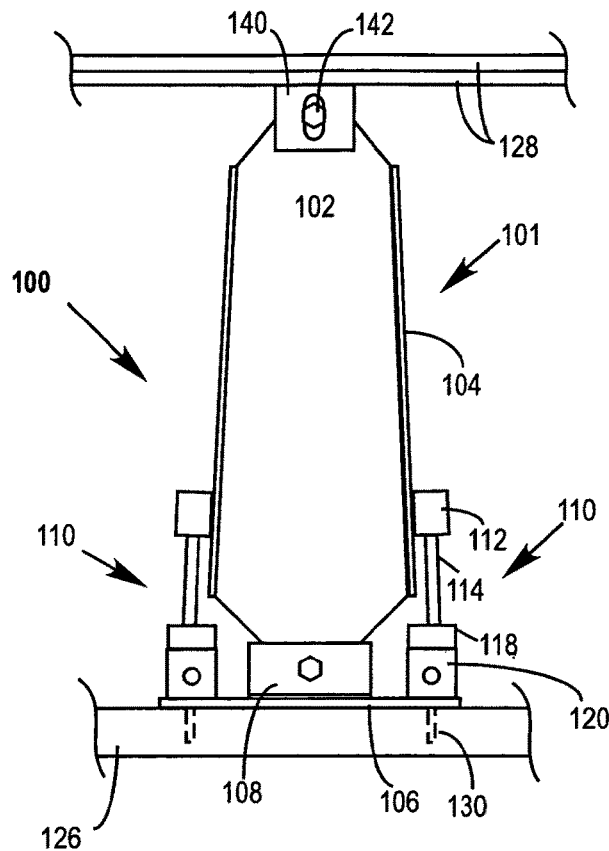
FIG. 7 is a front view of a lateral bracing system shown in FIG. 6.

One such alternative embodiment for affixing bracing system 100 to top plates 128 is shown in FIGS. 6 and 7. The embodiment shown in FIGS. 6 and 7 is substantially similar to the embodiments disclosed with respect to FIGS. 2-5, with the exception that moment frame 101 is affixed to top plates 128 via a pivot coupling such as a pin joint. In particular, the moment frame may be affixed to the top plates by a pair of right angle brackets 140 similar in structure and operation to right angle brackets 108. A pin 142 is received within aligned holes formed through brackets 140 and a top portion of diaphragm 102 to affix the moment frame 101 to top plates 128. The pin joint allows pivoting of lateral bracing system 100 with respect to top plates 128 without generating sheer stresses in the diaphragm 102 or top plates 128. Thus, upon yielding of the yield links as previously explained, damage to the moment frame is prevented by allowing the moment frame to pivot and dissipate the energy within the moment frame which could otherwise damage the moment frame if it were allowed to build up beyond the yield point of the moment frame.

In embodiments, the top portion of diaphragm 102 has edges which slope downward from a neutral longitudinal axis of diaphragm 102 to framing members 104 as shown in FIGS. 6 and 7. The slope prevents contact or binding of portions of lateral bracing system 100 against top plates 128 upon pivoting of the lateral bracing system under lateral loads.

As is further shown in FIGS. 6 and 7, the aligned holes formed in respective brackets 140 for receiving pin 142 have an oblong shape. This shape significantly or entirely prevents vertical loads from top plates 128 from being transmitted to lateral bracing system 100. Thus, only lateral loads are transmitted. As explained hereinafter, the decoupling of vertical loads allows for easier control and predictability of the yield links performance.

As seen in FIGS. 6 and 7, the diaphragm 102 has longitudinal edges and framing members 104 which slope inward from bottom to top, for example, 2 to 10 degrees from vertical. It is understood that the edge may be vertical (i.e. 0 degree slope) in alternative embodiments. It is understood that the embodiments described with respect to FIGS. 2-5 above, and FIGS. 8-9 below may have similarly sloped edges.

Figure 9:
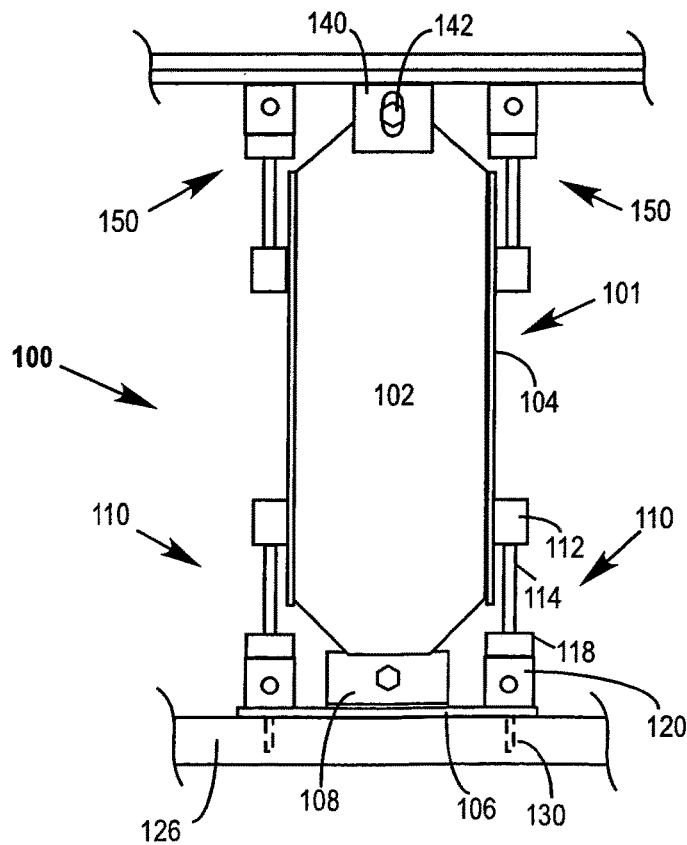
FIG. 9 is a front view of the lateral bracing system shown in FIG. 8.
Figure 8:
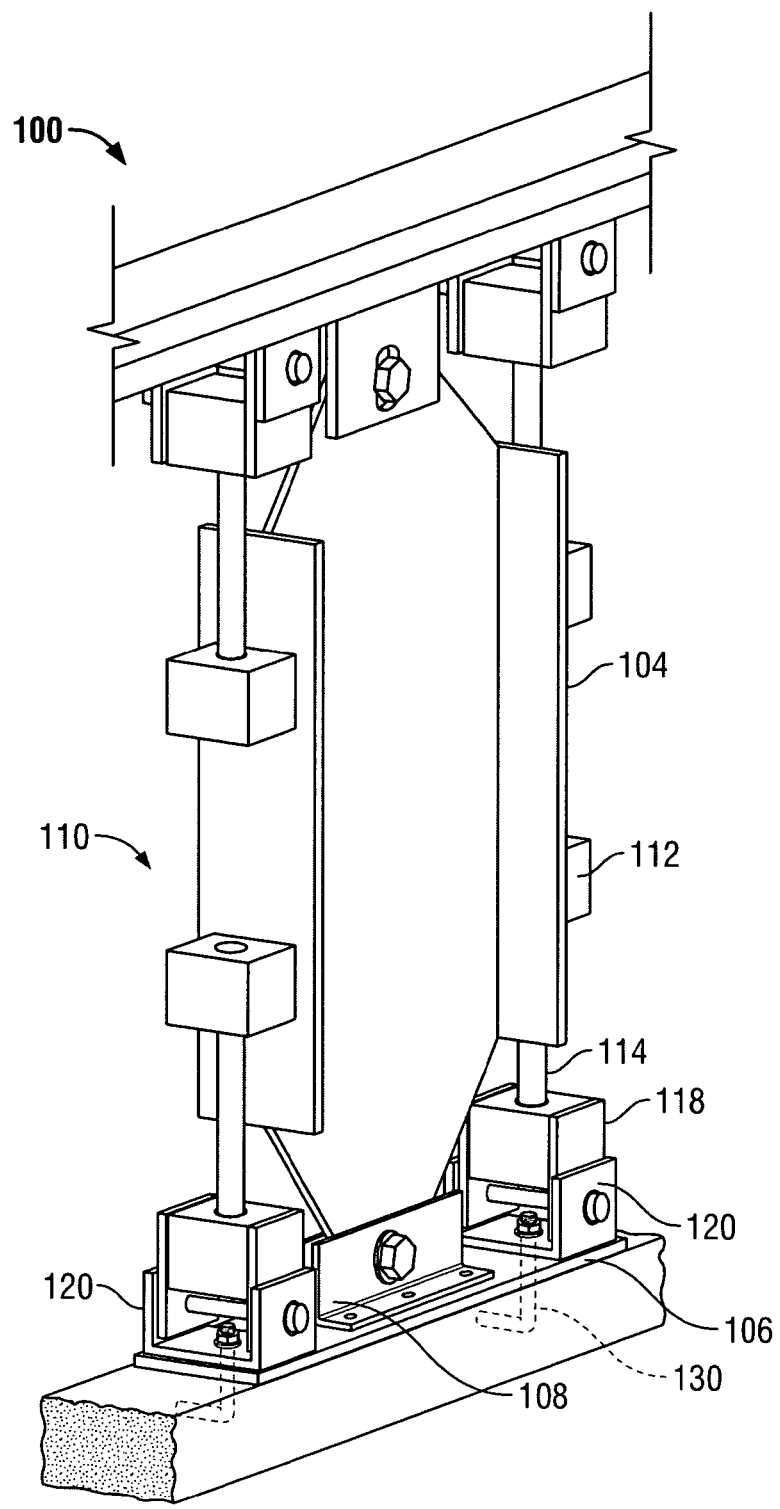
FIG. 8 is a perspective view of the lateral bracing system according to a third embodiment of the present invention.

A further alternative embodiment of the present invention is shown in FIGS. 8 and 9. The embodiment shown in FIGS. 8 and 9 is similar to the embodiments described above with respect to FIGS. 6 and 7, with the exception that a second pair of yield links 150 are provided. Yield links 150 are mounted between moment frame 101 and top plates 128, and are structurally and operationally similar to yield links 110. Yield links 110 and 150 together with framing members 104 define a structural frame providing high initial stiffness and stable, controlled and predictable yielding under lateral forces above a predetermined threshold level. The addition of the second pair of yield links improves the rigidity of the structure while still allowing the links to yield prior to damage to the structural moment frame. It is understood that yield links 110 may be omitted in alternative embodiments leaving only yield links 150 at the top of the moment frame.

The width of the lateral bracing system 100 may be such that it fits in between support studs formed in a wall. Thus, a plurality of lateral bracing systems according to the present invention may be provided within a wall to greatly enhance the ability of the wall to withstand lateral loads and sheer stresses. In one embodiment, the width of the lateral bracing system may be approximately 14 inches. However, the width may be greater than or less than 14 inches in alternative embodiments. Moreover, the lateral bracing system 100 need not fit between support studs in alternative embodiments.

In accordance with the embodiments of the present invention described above with respect to FIGS. 2-9, lateral bracing system 100 has sufficient stiffness and rigidity to provide a high degree of resistance to deflection under applied lateral loads. However, at lateral loads above a controllable and predictable level, the structure of the present invention provides for stable yielding of the yield links and deflection of the moment frame. In this way, the applied lateral loads are hysteretically dampened from the system, and a high degree of energy is dissipated, thereby preventing damage to the moment frame 101.

Moreover, the energy dissipation provided by the yield links described above allows the lateral bracing system 100 to be designed to withstand lower sheer forces in comparison to conventional systems of similar dimensions. This translates into lower design forces for the anchors and underlying support surface as well. Thus, the reduction in design forces within lateral bracing system due to the yield links 110/150/160 cascades throughout the entire design.

Furthermore, isolating the vertical loads with the pin joints at the top and/or bottom of the lateral bracing system allows for easy and predictable control of various parameters of the lateral bracing system, including for example the initial stiffness of the lateral bracing system, the amount of deflection the top of the wall may undergo, the amount of force required before the yield links will yield, and peak anchor bolt demands. Moreover, the energy dissipation and stable yielding of the yield links allow the system 100 to withstand repeated deflection under lateral loads without failure.

In the event the links are damaged upon yielding, the lateral bracing system may be restored to its virgin integrity and load bearing capabilities simply by removing and replacing the yield links. The structural frame remains intact and need not be replaced.

In embodiments of the present invention discussed thus far, the lateral bracing system 100 has been comprised of a moment frame having yield links affixed to either side. In further embodiments of the present invention, the lateral bracing system 100 may be formed of a vertical column affixed to a horizontal beam by a moment resisting joint comprised of a central mounting element and yield links on either side of the mounting element. The moment resisting joint provides moment and displacement resistance between the beam and column, while allowing stable yield upon high lateral forces. Such embodiments are shown and described hereinafter with reference to FIGS. 10 through 15.

Figure 10:
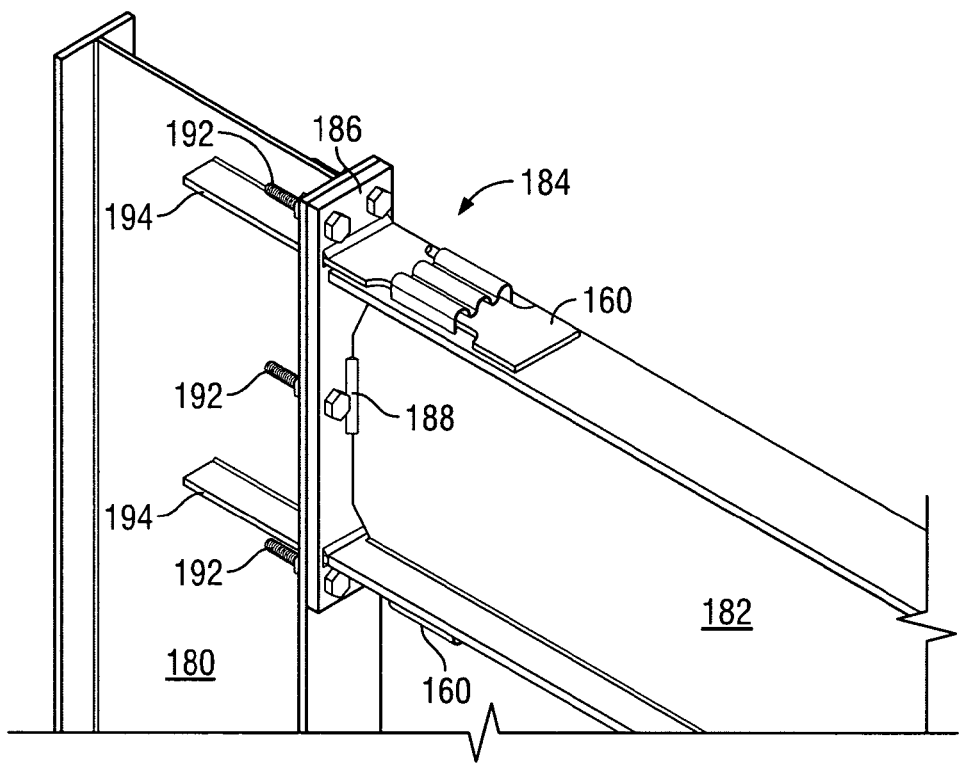
FIG. 10 is a perspective view of a lateral bracing system according to an alternative embodiment of the present invention.
Figure 11:
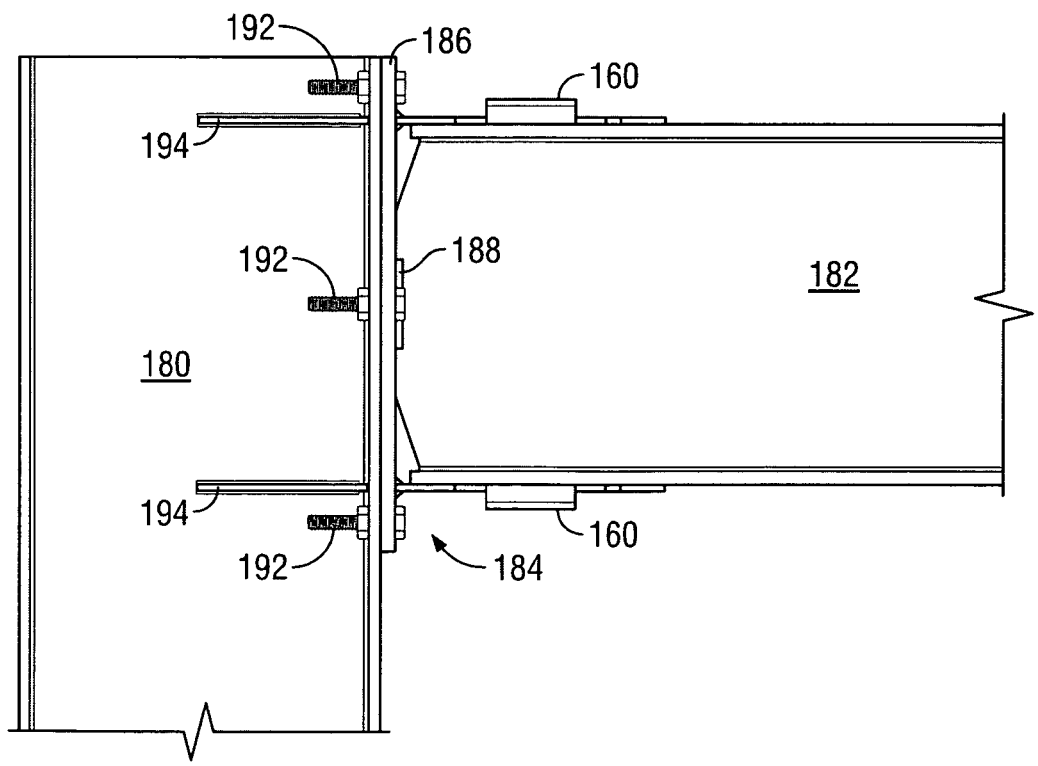
FIG. 11 is a front view of the lateral bracing system according to FIG. 10.
Figure 12:
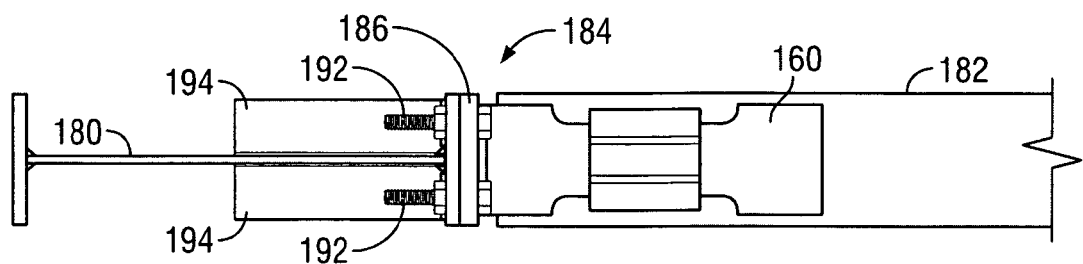
FIG. 12 is a top view of the lateral bracing system according to FIG. 10.

Referring to FIGS. 10-12, there is shown a lateral bracing system 100 including a vertical column 180 affixed to a horizontal beam 182 by a moment resisting joint 184 comprised of a central mounting element 188 and yield links 160. Although referred to as a vertical column and a horizontal beam, it is understood that the column and beam may be affixed to each other by a moment resisting joint at angles other than 90° in alternative embodiments. The moment resisting joint includes yield links 160, for example as shown and described above with reference to FIG. 5A. In the embodiment shown, an end of the beam is mounted onto the side of the column via an end plate 186. In such an embodiment, the pair of yield links 160 may be provided on top and bottom horizontal flanges of the beam 182 between the beam and the end plate. However, as explained hereinafter, the beam may alternatively be on top of the column so that an end of the column is mounted to a flange of the beam via an end plate. In such embodiments, the yield links 160 would be provided on respective vertical flanges between the column and the end plate.

Figure 13:
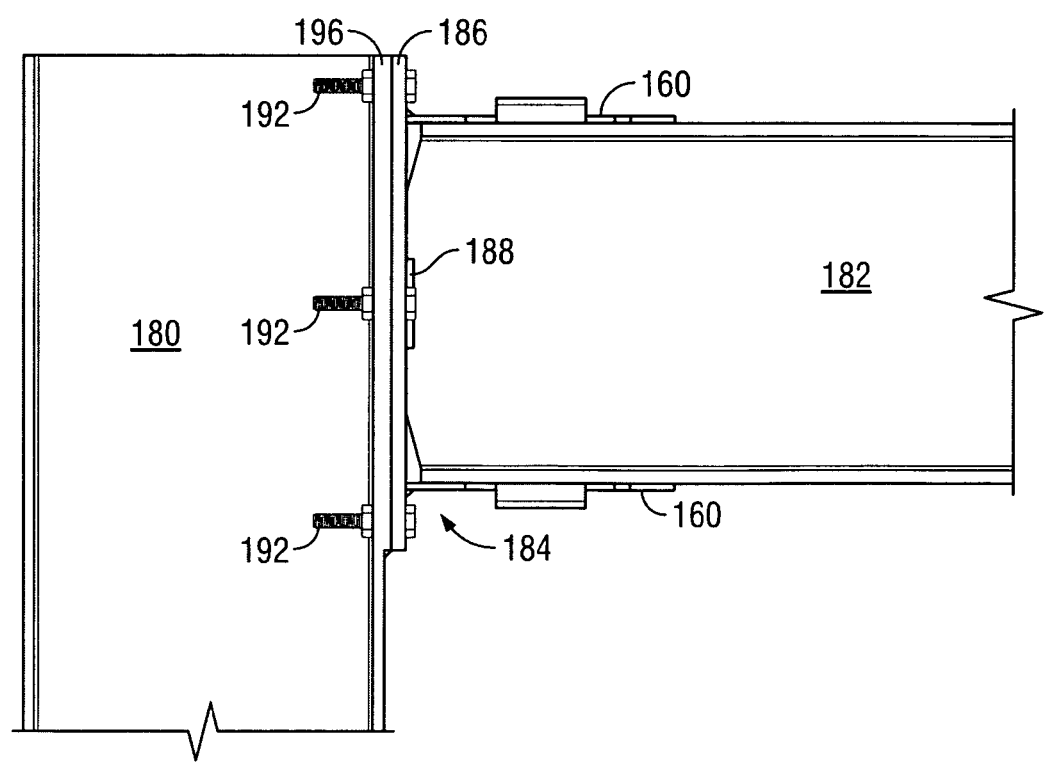
FIGS. 13 through 16 are alternative embodiments of the lateral bracing system shown in FIGS. 10-12.
Figure 14:
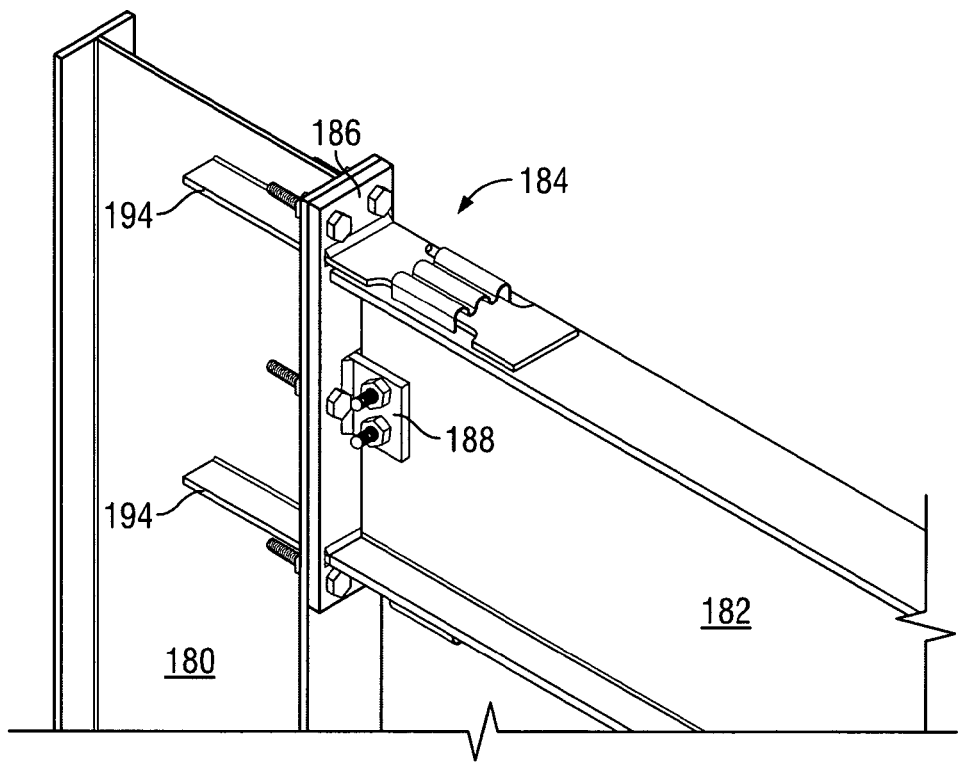
Figure 15:
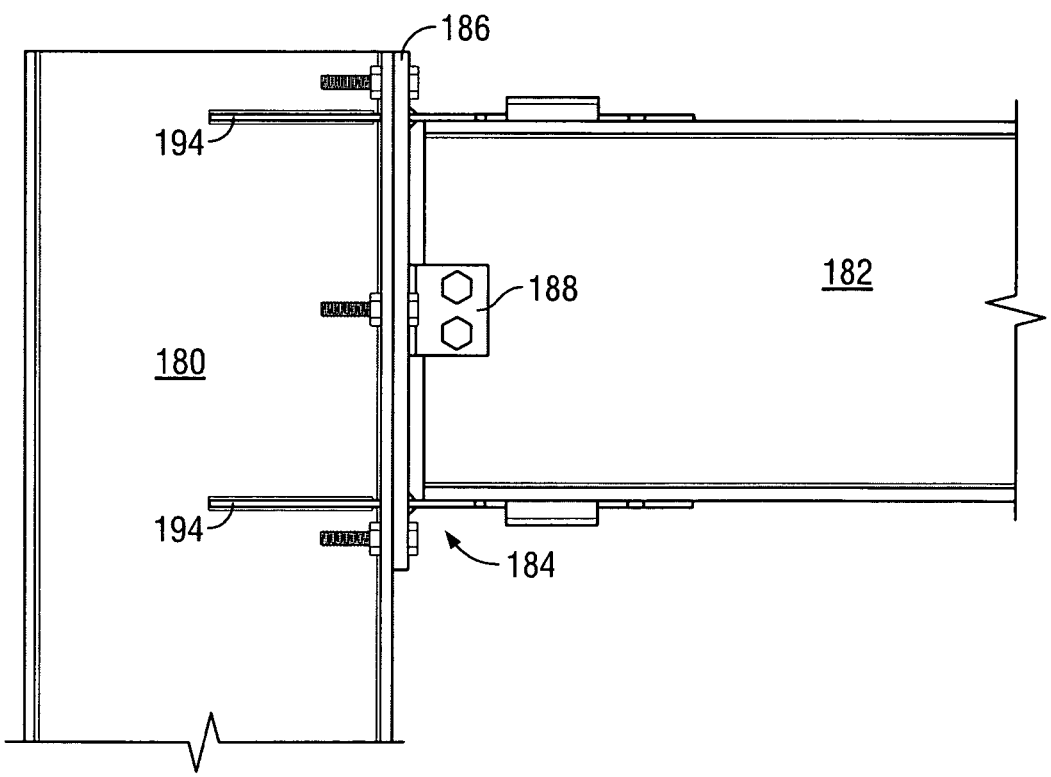
Figure 16:
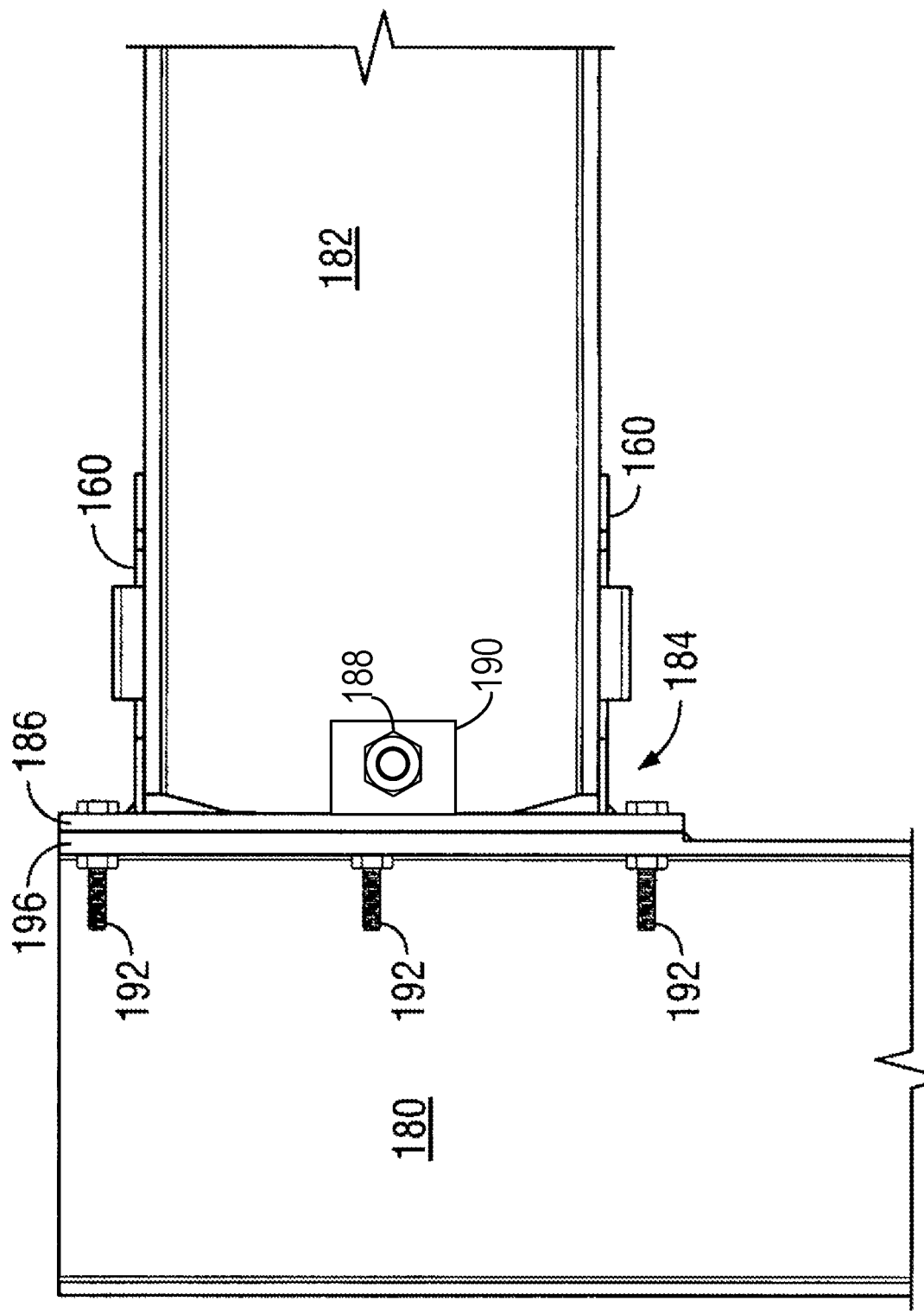

As seen in FIGS. 10 and 11, the beam 182 may include a central diaphragm with sloping edges as shown and as described above. A central point of the diaphragm may be affixed to end plate 186 via a mounting element 188. The mounting element 188 may be no more than a welded seam, such as shown in FIGS. 10 and 11. However, it is understood that the central diaphragm of the beam may be affixed to the end plate by other types of mounting elements, such as for example a pair of brackets having a pin joint (FIGS. 5 and 5A) or a pair of brackets or plates not having a pin joint, but instead simply affixing the diaphragm to the end plate as by bolts (FIG. 16), welds, gluing and/or other affixation means (FIGS. 14 and 15). The end plate 186 is in turn affixed to a vertical flange of the column 180 via bolts 192, welding, gluing and/or other affixation means. The yield links shown in FIGS. 10-15 are those described above with respect to FIG. 5A. However, it is understood that any configuration of yield link described herein may be used in the embodiments described with reference to FIGS. 10-15.

In order to provide greater load-bearing capabilities at the joint between the column and beam, stiffeners 194 may be welded, bolted, glued and/or otherwise affixed to the central diaphragm and flange of the column 180. As seen in FIGS. 10-12, the stiffeners 194 are structural pieces that extend perpendicularly from the opposed surfaces of the central diaphragm and flange on both the front and back surfaces of the diaphragm. Four such stiffeners are shown in FIGS. 10-12. The stiffeners may extend partly across the column diaphragm as shown, or entirely across the diaphragm. FIG. 13 shows an alternative system to improve the load-bearing capabilities at the joint between the column and beam. As shown therein, the portion 196 of the vertical flange in contact with the end plate 186 may be made thicker. This may be done by removing the top portion of the flange and replacing it with a thicker member, or otherwise fortifying the top portion of the flange. The portion 196 may be used instead of or in addition to the stiffeners 194. It is further understood that the stiffeners 194 and/or thicker portion 196 may be omitted in embodiments of the present invention.

The moment resisting joint shown in FIGS. 10-13 provides high initial stiffness and resistance to relative movement between the column 180 and the beam 182 under lateral loads, but provides stable yielding under lateral loads above a controllable level. In particular, bending strength of the column and beam could be designed to exceed the moment capacity of the yield links. Thus, the yield links 160 yield under lateral loads before bending or deformation of the column or beam, and any damage is limited to the yield links which may be easily removed and replaced. Furthermore, the beam could be configured to either run over the top of the column, or frame into the side of the column, without impacting the performance of the connection via the yielding links.

Additionally, the moment resisting joint between the beam and column alleviates the need for a similar connection at the column base, at, for example, the foundation or lower floor. This means that forces that would otherwise be transmitted to the foundation or floor are drastically reduced, and energy dissipation of a lateral event would be contained within the frame and not rely on a yielding connection to the surrounding structure. Such a beam/column configuration may be used in a variety of applications, such as for example at the structural opening at garage fronts in light frame constructions, or around windows in light frame constructions. In such an installation a column element could also be placed on either side of the beam element allowing for two energy dissipating joints in the assembly, each containing of a pair of yielding links.

In embodiments of the invention, it is understood that the portion of the central diaphragm which affixes to the sill plate (FIGS. 2-9) or endplate (FIGS. 10-15) need not have sloping edges. Such an embodiment is shown in FIGS. 14 and 15. In this embodiment, the central diaphragm of the beam may affix to the endplate as by a mounting element 188 in the form of a plate which is bolted to the central diaphragm and welded to the endplate. It is understood that the mounting element 188 may be affixed to both the central diaphragm and endplate by bolting, welding, gluing and/or other mounting means in alternative embodiments. As best seen in FIG. 15, a slight space may be left between the end of the beam 182 and endplate 186 to allow rotation between the beam and column upon high lateral loads and yielding of the yield links without binding between the column and beam. It is understood that the moment frame 101 of FIGS. 2-9 may also be affixed at its top or bottom with a configuration as shown and described with respect to FIGS. 14 and 15.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A bracing system for use in constructions, the bracing system comprising:
   a structural frame having a first structural support member and a second structural support member;
   a mounting element affixed between the first structural support member and a central portion of the second structural support member, the mounting element configured to affix the central portion of the second structural support member to the first structural support member, the second structural support member pivoting clockwise about a pivot point at the mounting element upon a first load exerted on the structural frame, and the second structural support member pivoting counterclockwise about the pivot point at the mounting element upon a second load exerted on the structural frame, the second load being opposite to the first lateral load, the first structural support member being spaced from the second structural support member at locations on either side of the central portion, the space on either side of the central portion and the mounting element enabling rotation of the first structural support member relative to the second structural support member; and
   a yield link affixed at a first end to the first structural support member and at a second end, opposite the first end, to the second structural support member, the yield link comprising a mid-section between the first and second ends having a width smaller than a width of the yield link at the first and second ends and capable of yielding in tension and compression to dissipate stress within the frame upon a lateral load applied to the structural frame.

2. The bracing system recited in claim 1, further comprising a buckling restraint block affixed to the second structural support member, the buckling restraint block limiting buckling of the yield link.

3. The bracing system recited in claim 1, the yield link comprising a first yield link, the bracing system further comprising a second yield link, the first and second yield links positioned at top and bottom flanges of the second structural support member.

4. The bracing system recited in claim 3, wherein the second yield link comprises a section between first and second ends of the second yield link capable of yielding in tension and compression to dissipate stress within the frame upon a lateral load applied to the structural frame.

5. A bracing system as recited in claim 4, wherein the buckling restraint block comprises a first buckling restraint block, the bracing system further comprising a second buckling restraint block affixed to one of the flanges of the second structural support member, the second buckling restraint block limiting buckling of the second yield link.

6. A bracing system for use in constructions, the bracing system comprising:
   a structural frame having a first structural support member and a second structural support member;
   a mounting element affixed between the first structural support member and a central portion of the second structural support member, the mounting element including a central hole configured to align with an opening in the central portion of the second structural support member, and configured to receive a bolt through the central hole and opening to affix the central portion of the second structural support member to the first structural support member and to allow rotation of the second structural support member relative to the first structural support member, the central hole defining an axis of rotation of the second structural member relative to the first structural member such that the second structural support member pivots clockwise about the axis of rotation upon a first load exerted on the structural frame, and such that the second structural support member pivots counterclockwise about the axis of rotation upon a second load exerted on the structural frame, the second load being opposite to the first lateral load; and
   a yield link affixed at a first end to the first structural support member and at a second end, opposite the first end, to the second structural support member, the yield link comprising a section between the first and second ends capable of yielding in tension and compression to dissipate stress within the frame upon a lateral load applied to the structural frame.

7. The bracing system of claim 6, wherein the first structural support member is spaced from the second structural support member at locations on either side of the central portion, the space on either side of the central portion and the mounting element enabling rotation of the first structural support member relative to the second structural support member.

8. The bracing system recited in claim 6, further comprising a buckling restraint block affixed to the second structural support member, the buckling restraint block limiting buckling of the yield link.

9. The bracing system recited in claim 6, wherein the section of the yield link has a smaller width than the ends of the yield link.

10. A construction, comprising:
    a first structural support member;
    a second structural support member including sloped edges sloping back a central portion of the second structural support member toward top and bottom edges of the second structural support member;

a mounting element affixed between the first structural support member and the central portion of the second structural support member, the mounting element configured to affix the central portion of the second structural support member to the first structural support member and the mounting element configured to allow rotation of the second structural support member relative to the first structural support member about a pivot point; and a lateral bracing system affixed between the first and second structural support members, including:

a pair of yield links, each yield link including a first end affixed to the first structural support member, and a second end affixed to the second structural support member, a yield link of the pair of yield links having a middle section of smaller width than at the first and second ends, the middle section capable of yielding in tension and compression to dissipate stress within at least one of the first and second structural support members upon a lateral load applied to at least one of the first and second structural support members, and the sloped edges of the second structural support member preventing binding of the second structural member as the second structural member rotates about the pivot point relative to the first structural support member.

11. The bracing system recited in claim 10, further comprising first and second buckling restraint blocks, the first and second buckling restraint blocks affixed to top and bottom flanges of the second structural support member, the first and second buckling restraint blocks limiting buckling of the first and second yield links.

\* \* \* \* \*